United States Patent [19]
Kohchi

[11] Patent Number: 5,559,420
[45] Date of Patent: Sep. 24, 1996

[54] ELECTRICITY SUPPLY UNIT TRAILER FOR ELECTRIC VEHICLES

[75] Inventor: Akira Kohchi, Ashiya, Japan

[73] Assignee: Institute For Home Economics Of Japan, Inc., Hyogo-ken, Japan

[21] Appl. No.: 237,119

[22] Filed: May 3, 1994

[30] Foreign Application Priority Data

Sep. 7, 1993 [JP] Japan .................. 5-221929

[51] Int. Cl.$^6$ ................................. H01M 10/46
[52] U.S. Cl. .................. 320/2; 180/65.1; 280/492
[58] Field of Search ................. 320/2, 5; 180/65.1; 280/502, 500, 492, 511; 104/34

[56] References Cited

U.S. PATENT DOCUMENTS

| | | |
|---|---|---|
| 1,065,161 | 6/1913 | Metz . |
| 2,159,885 | 5/1939 | Cullin . |
| 3,797,862 | 3/1974 | Letterman . |
| 4,444,408 | 4/1984 | Goth ........................ 280/492 X |
| 4,664,403 | 5/1987 | Livingston ............... 280/492 X |
| 5,301,765 | 4/1994 | Swanson . |
| 5,382,480 | 1/1995 | Molyneux . |
| 5,392,873 | 2/1995 | Masuyama et al. . |
| 5,449,995 | 9/1995 | Kohchi ......................... 320/15 |

*Primary Examiner*—Peter S. Wong
*Assistant Examiner*—Edward Tso
*Attorney, Agent, or Firm*—Price, Gess & Ubell

[57] ABSTRACT

A power pack of batteries are enclosed in an encasement for protection and air-cooling. The encased batteries ride on wheels, and keep supplying power to an electric vehicle while attached to it. The unit can even generate additional electricity extending the driving range. When power is spent, run-down batteries are replaced by the wheeled unit with recharged ones, and the vehicle drivability is renewed on the spot.

16 Claims, 2 Drawing Sheets

ELECTRICITY SUPPLY UNIT TRAILER FOR ELECTRIC VEHICLES

FIELD OF THE INVENTION

This invention relates to an off-board system of supplying of electricity to electric vehicles in motion.

BACKGROUND OF THE INVENTION

The accumulator batteries that supply driving power to an electric vehicle occupy in their aggregate a considerable part of the total vehicular weight and bulk, thereby restricting transport capacity of the vehicle which would be otherwise left available. Battery capacity sets the driving range and in recharging run-down batteries, it becomes obligatory that the vehicle be rendered immobile for several hours on the average. Rapid recharge systems would reduce this binding time to the order of several ten minutes but only in exchange for a ceiling held at no more than 60 percent of the full battery capacity, extremely high voltage and current to force through, attendant hazards and shortened battery-life. Battery swapping systems, another attempt to reduce the binding time, have not yet been satisfactorily developed. As a result the operator of an electric vehicle is invariably held under a psychological strain of fear for being unexpectedly stranded.

An object of the present invention then is to provide an electricity supply unit for electric vehicles which does not occupy the interior of an electric vehicle but permits added transport capacity to the vehicle while providing a supplemental source of electricity.

It is another object of this invention to provide an electricity supply unit for electric vehicles which is itself transportable, and hence easily attached to or detached from a vehicle while its battery pack can be easily replaced.

It is a further object of this invention to provide an electricity supply unit for electric vehicles which generates additional electricity while attached to a running vehicle.

SUMMARY OF THE INVENTION

These objects are addressed by the present invention which provides a novel electricity supply unit comprising a driving power source means for an electric vehicle which is located extraneous to the vehicle, said power source means having a plurality of batteries enclosed in an encasement; wheel means for rolling on the ground; mechanical and electrical means for attaching the power source to the vehicle; generators driven by said wheels; and a circuit wiring for accepting generated electricity.

Further objects, features and advantages of the invention will become apparent from the following description when taken in conjunction with the accompanying drawings.

DESCRIPTION OF THE PREFERRED EMBODIMENT

Figure 1:
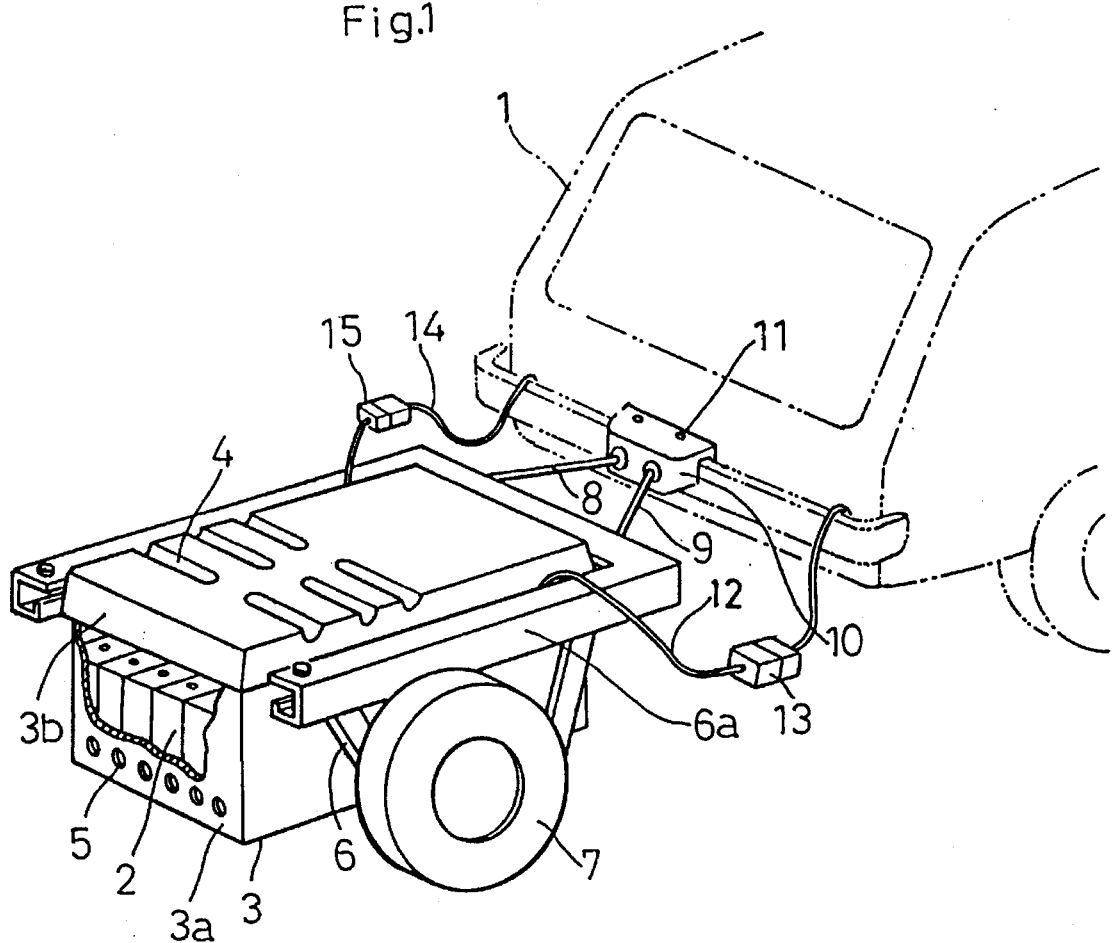
FIG. 1 illustrates a partially cutaway perspective view of an electricity supply unit constructed and attached to an electric vehicle in accordance with the invention.

As shown in FIG. 1 illustrating a perspective view, this electricity supply unit is not part of but is independent of an electric vehicle 1 to which it supplies electricity. A large number of batteries 2 are enclosed compactly in a sturdy encasement 3 made of a fit material and comprising a box 3a and a lid 3b. Indented or protruding radiation fins 4 are provided on the encasement 3 for air-cooling, as well as air-circulation ports 5. A frame body 6 mounted on a pair of wheels 7 includes a pair of connecting rods 8 and 9, and a clamp 10. The clamp 10 is fastened to the vehicle 1 in any one of a number of conventional ways, or by bolting through holes 11.

Electricity from the batteries 2 is supplied through a conducive cable 12 and an electrical connector 13 to the vehicle, whereas driver-operated electric signals are sent back through conducive cords 14 and an electrical connector 15 for controling generators (not shown) and other auxiliary circuits.

Figure 2:
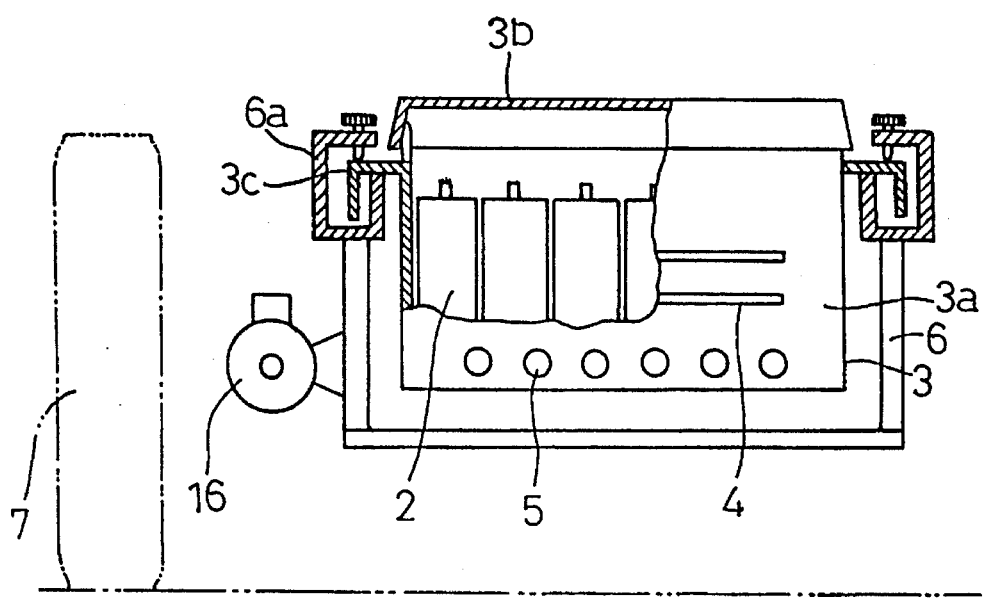
FIG. 2 illustrates a partially cutaway rear view of the electricity supply unit.

Referring to FIG. 2 that shows a partial rear view, the spaced batteries 2 are grouped in two, each group connected in series and ending at respective pairs of terminals (not shown), thereby enabling an operator of the vehicle to choose a different combination set of voltage and current depending upon driving conditions. A pair of bearing frames 6a which is part of the U-shaped frame body 6 holds the loaded encasement 3 in suspension by a pair of reinforced and extended rims 3c mounted in elongated slots. The battery encasement member 3 can be slidably inserted within the U-shape frame body 6 through the open ends of the bearing frames or side support rails 6a. The rims 3c are additionally bolted through said bearing frames 6a. One or more generators 16 mounted on the frame body 6 are driven continuingly or intermittently by any one of methods known in the art utilizing the rotation of the wheels 7, and the generated electricity is used to extend the driving range or change the driving characteristics of said vehicle 1.

Figure 3:
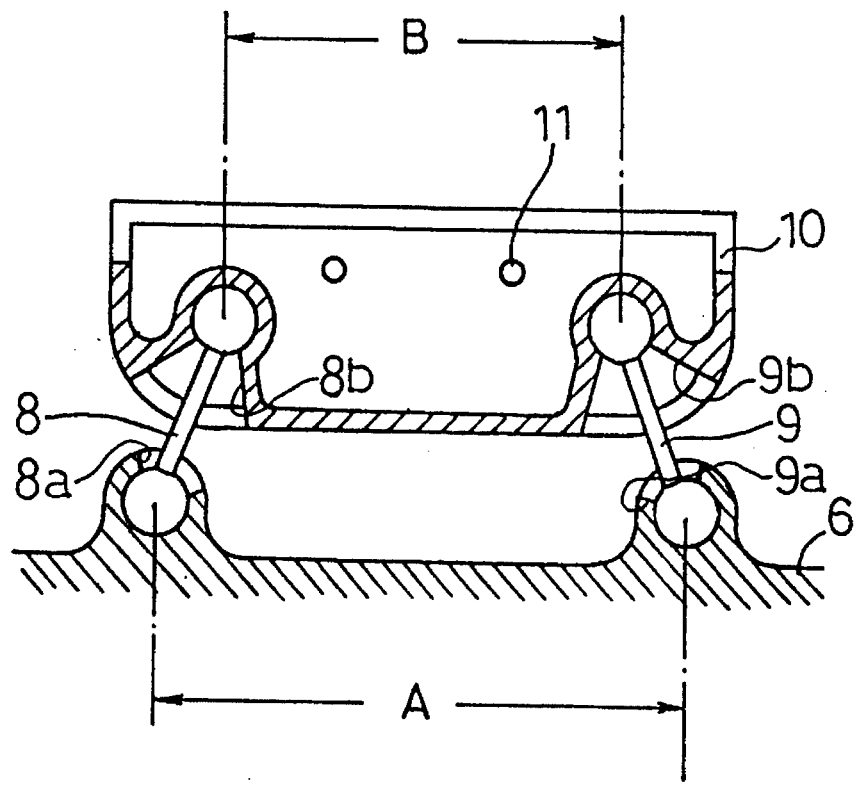
FIGS. 3 and 4 illustrate cross-sectional views of a direction confining means constructed in accordance with the invention in its normal mode and direction-confined mode respectively.

FIG. 3 shows a cross-sectional view of the clamp 10 and a draw bar part of the frame body 6 both housing the aforementioned connecting rods 8 and 9 in the normal mode of a train. The diameter of balls formed at both ends is made larger than that of said rod 8 or 9. The balled ends are received snugly fit by corresponding spherically hollow bearings included in the clamp 10 and the frame body 6. Said rods 8 and 9 are not disposed in parallel but as illustrated, wherein the distance A is not equal to the distance B.

Figure 4:
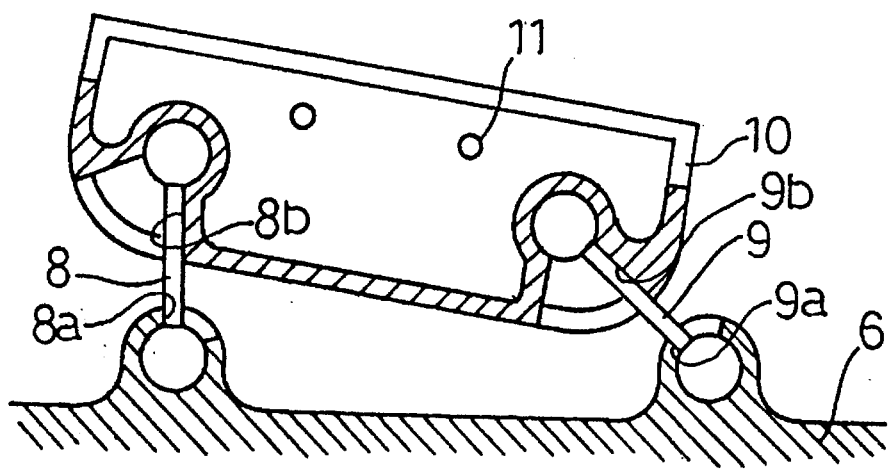

FIG. 4 shows a view of aforementioned parts cooperatively confining the linear directions of the train within a predetermined degree of angle. A customary pivotal connection is known to have a towed vehicle cut corners when turning and a pushed vehicle go astray when backing. Whereas the connecting rods of FIG. 4, abutted by all of conical surfaces 8a, 8b, 9a and 9b provided on the clamp 10 and the frame body 6, prevent this excessive and unintentional misalignment for the most of drivers who are without a special training or knack.

An electricity supply unit of this invention is detached from an electric vehicle, irrespective of the location of the vehicle or whether a stop has been anticipated or unanticipated, and the unit is easily, quickly and safely replaced by another. A spent unit is then recycled through a Battery Charge Station (as described in Having described but a preferred embodiment of the invention, it will be appreciated that variations can be made thereto without departing from the spirit or scope of the invention.

What is claimed is:

1. A unit apparatus for supplying electricity to art electric vehicle comprising:

a plurality of batteries for accumulating electricity;

an encasement for enclosing said batteries in a compact manner;

means provided on said encasement for cooling said batteries;

terminals provided on said encasement and electrically connected with said batteries therein;

electric cables with a multi-plug connector for supplying electricity from said batteries through said terminals to an electric vehicle;

transportation means for permitting movement whereby said encasement is removably held on a frame body mounted on wheels, said frame body having a draw bar, the encasement being configured to slide onto and off of the frame body;

securing means at said draw bar for securing said unit to said vehicle; and electric cords with a multi-plug connector for receiving control signals from said vehicle.

2. The unit apparatus for supplying electricity to an electric vehicle as defined in claim 1 wherein said cooling means includes port openings, and indented or protruding radiation fins thereon, and spacers provided on an interior floor of said encasement for separating each of said batteries from another.

3. The unit apparatus for supplying electricity to an electric vehicle as defined in claim 2 wherein said encasement includes a pair of extended lateral rims opposedly provided on said encasement and a pair of bearing frames affixed to said frame body and of a configuration to slidingly receive and support said rims thereon.

4. The unit apparatus for supplying electricity to an electric vehicle as defined in claim 3 wherein said terminals include more than one pair of anode and cathode members for selectively combining voltage and current supplied by said batteries depending upon the driving need of said vehicle.

5. The unit apparatus for supplying electricity to an electric vehicle as defined in claim 3 wherein said securing means includes a ball and socket connection.

6. The unit apparatus for supplying electricity to an electric vehicle as defined in claim 3 wherein said securing means includes a ball and socket connection connecting a clamp on an electric vehicle and said draw bar.

7. The unit apparatus for supplying electricity to art electric vehicle as defined in claim 3 wherein said securing means includes a clamp and a pair of connecting rods provided between said clamp and said draw bar, said connecting rods having a ball at each end, said clamp and draw bar having corresponding spherical hollow receptacles to receive said balled ends snugly fit therewithin, and said rods being nonparallely disposed for confining the directional bearing of the frame body within a predetermined conical angle defined by apertures of said receptacles working in cooperation and together.

8. The unit apparatus for supplying electricity to art electric vehicle as defined in claim 3 wherein provided on said frame body are generators for generating electricity, said generators having a drive mechanism thereof which, when controlled by the operator of said vehicle, can come into contact with said wheels, and auxiliary circuits including a circuit for charging said batteries with said generated electricity from said generator.

9. A detachable battery trailer for connection to a vehicle to supply electricity to the vehicle, comprising:

a U-shaped frame member having a pair of elongated slots;

means for translating the frame member across a support surface, including a pair of wheels operatively connected to the frame member;

a battery assembly;

a removable battery housing having a pair of extended support rims, one on each side of the housing, outer edges of the support rims being configured to be slidably mounted within the respective elongated slots of the U-shaped frame member for supporting the battery assembly;

means for removably fixing the battery housing to the U-shaped frame member;

means for supplying the electricity from the battery assembly to the vehicle; and means for interconnecting the U-shaped frame member to a vehicle.

10. The battery trailer of claim 9 wherein the means for interconnecting includes a pair of spaced rods and a corresponding ball and socket connection for each rod on the respective frame member and on the vehicle, the spaced rods being pivotally connected to the vehicle and to the frame member.

11. The battery trailer of claim 9 further including power generating means operatively connected to the translating means for charging the battery assembly during movement of the trailer.

12. A detachable battery trailer assembly for connection to an electric vehicle, comprising:

a frame member having a pair of parallel side support rails, the support rails being hollow with opposite-facing elongated slots extending to an open rear face on each support rail;

means for translating the frame member across a support surface, including a pair of wheels operatively connected to the frame member;

a battery encasement member, having lateral parallel support rims, for removably supporting a plurality of batteries, the support rims being positioned on opposite sides of the encasement member and having a dimension to respectively extend into the elongated slots of the respective support rails, whereby the battery encasement member can be removably inserted into the frame member by inserting the support rims into the open rear faces of the support rails and moving the support rails along the elongated slots;

means for removably locking the battery encasement member to the frame member; and means for interconnecting the frame member to the electric vehicle including a pair of ball and socket mounted rod members that are positioned to extend between the frame member and the electric vehicle and stop means for contacting the rod member to limit a relative rotation.

13. A detachable battery trailer assembly as in claim 12 wherein the support rims have an inverted L cross-sectional shape to permit an end of the rim to extend downward into the hollow side support rail.

14. A detachable battery trailer assembly as in claim 13 wherein the side support rails are substantially a hollow rectangular shape with a lot along one side.

15. A detachable battery trailer assembly as in claim 12 wherein the frame member has a plan view U-shaped configuration with an open center.

16. A detachable battery trailer assembly as in claim 12 wherein the rod members are not mounted in parallel between the frame member and the electric vehicle.

* * * * *

UNITED STATES PATENT AND TRADEMARK OFFICE
CERTIFICATE OF CORRECTION

PATENT NO. : 5,559,420
DATED : September 24, 1996
INVENTOR(S) : Akira Kohchi

It is certified that error appears in the above-indentified patent and that said Letters Patent is hereby corrected as shown below:

Col. 2, line 63, after "in" insert --U.S. Pat. 5,449,995 issued on Sep. 12, 1995--.

Signed and Sealed this

Twenty-sixth Day of October, 1999

Attest:

Q. TODD DICKINSON

Attesting Officer

Acting Commissioner of Patents and Trademarks